United States Patent [19]
Blachetta et al.

[11] Patent Number: 5,771,527
[45] Date of Patent: Jun. 30, 1998

[54] WINDSHIELD WIPER DEVICE WITH CONTACT PRESSURE ADJUSTMENT DEPENDENT ON THE WIPING ANGLE

[75] Inventors: Thomas Blachetta; Bruno Egner-Walter, both of Heilbronn; Harro Buhl, Kirchheim, all of Germany

[73] Assignee: ITT Automotive Europe GmbH, Frankfurt, Germany

[21] Appl. No.: 765,362

[22] PCT Filed: Jun. 8, 1995

[86] PCT No.: PCT/EP95/02220

§ 371 Date: Apr. 1, 1997

§ 102(e) Date: Apr. 1, 1997

[87] PCT Pub. No.: WO96/01754

PCT Pub. Date: Jan. 25, 1996

[30] Foreign Application Priority Data

Jul. 8, 1994 [DE] Germany .......................... 44 24 076.7

[51] Int. Cl.[6] .......................................................... B60S 1/32
[52] U.S. Cl. ...................................................... 15/250.202
[58] Field of Search ...................... 15/250.202, 250.351, 15/250.34, 250.19, 250.21, 250.23

[56] References Cited

U.S. PATENT DOCUMENTS 5,426,815  6/1995  DaDeppo et al. ................. 15/250.202

FOREIGN PATENT DOCUMENTS

| | | |
|---|---|---|
| 0487859A1 | 6/1992 | European Pat. Off. . |
| PS880864 | 6/1953 | Germany . |
| 1555256 | 6/1970 | Germany .......................... 15/250.202 |
| 1918950 | 10/1970 | Germany . |
| 2928757 | 2/1981 | Germany .......................... 15/250.202 |
| 4028494A1 | 4/1991 | Germany . |
| 2-81750 | 3/1990 | Japan ................................. 15/250.202 |
| 3-176253 | 7/1991 | Japan ................................. 15/250.202 |
| 5-16765 | 1/1993 | Japan ................................. 15/250.202 |
| WOA9407712 | 4/1994 | WIPO . |

*Primary Examiner*—Gary K. Graham
*Attorney, Agent, or Firm*—J. Gordon Lewis; Thomas N. Twomey

[57] ABSTRACT

An adjusting lever pivoted on the attachment part moves during operation of the windshield wiper along a cam of a fixed rocker arm and thus pivots the contact spring to vary the force with which the wiper blade is pressed against the windshield being cleaned as a function of the particular wiper angle. The section of the adjusting lever on the rocker arm side has a fork-like design in which each fork leg rests upon an axially positioned cam of the rocker arm.

10 Claims, 4 Drawing Sheets

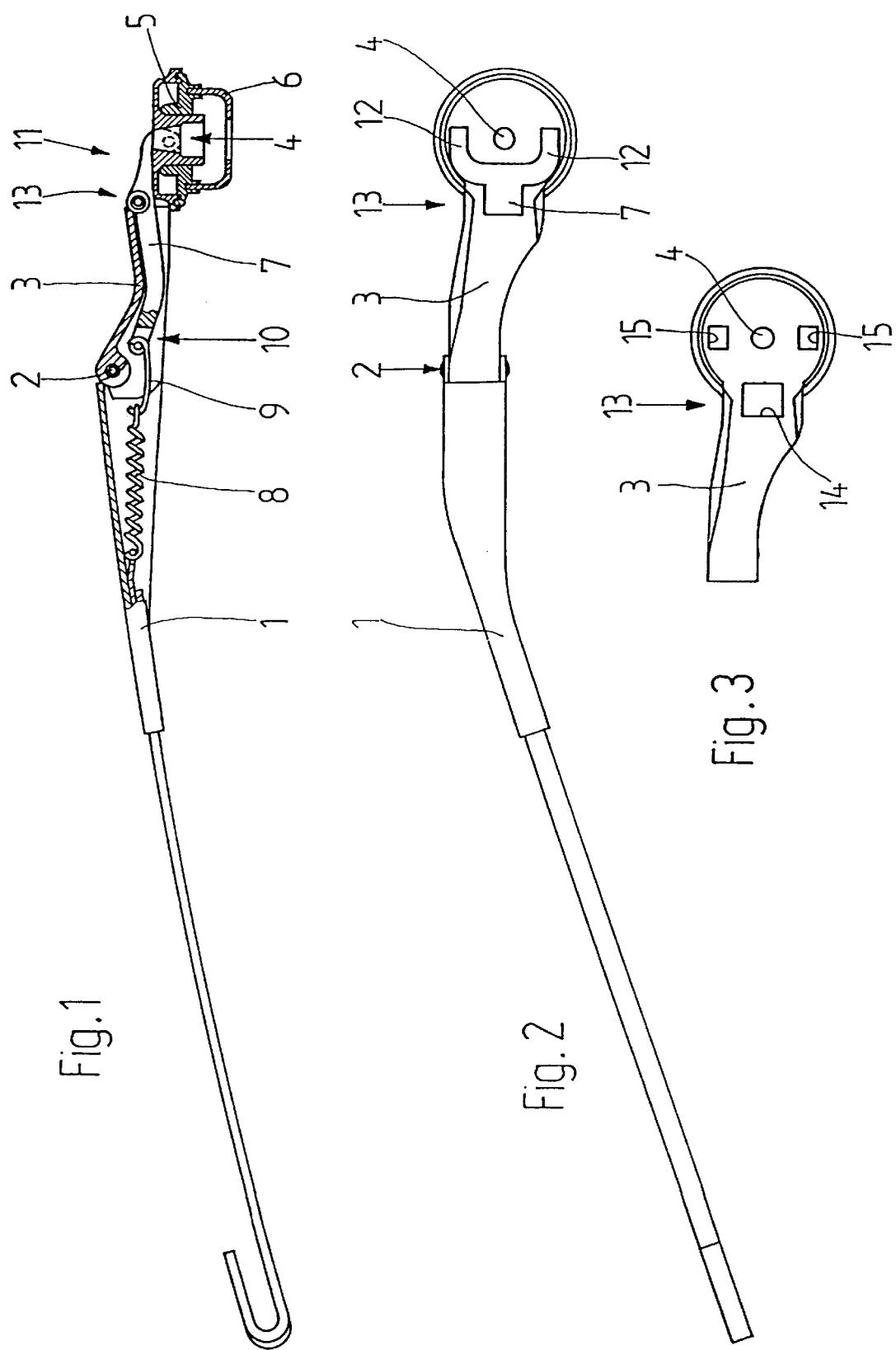

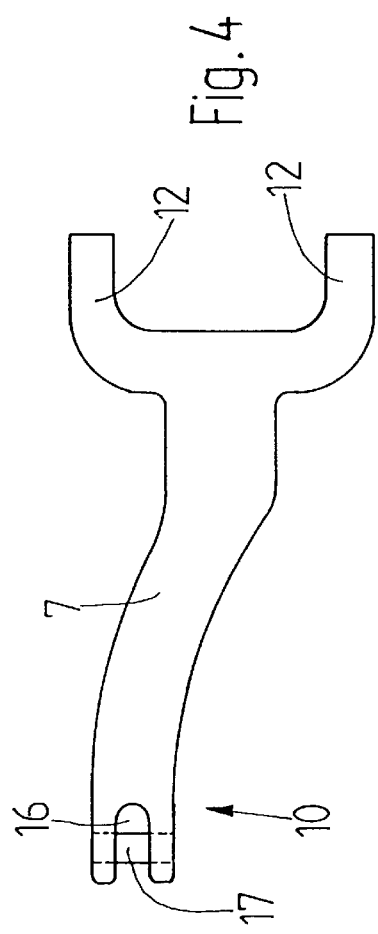
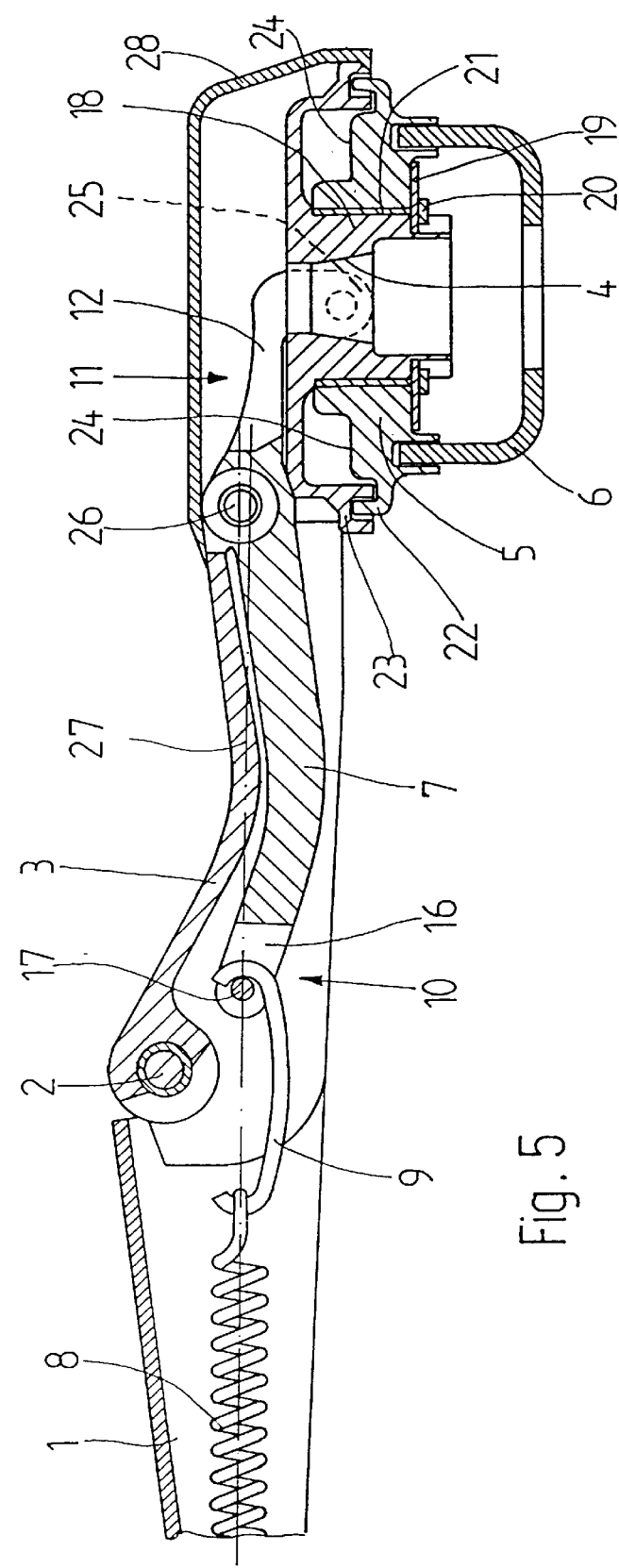

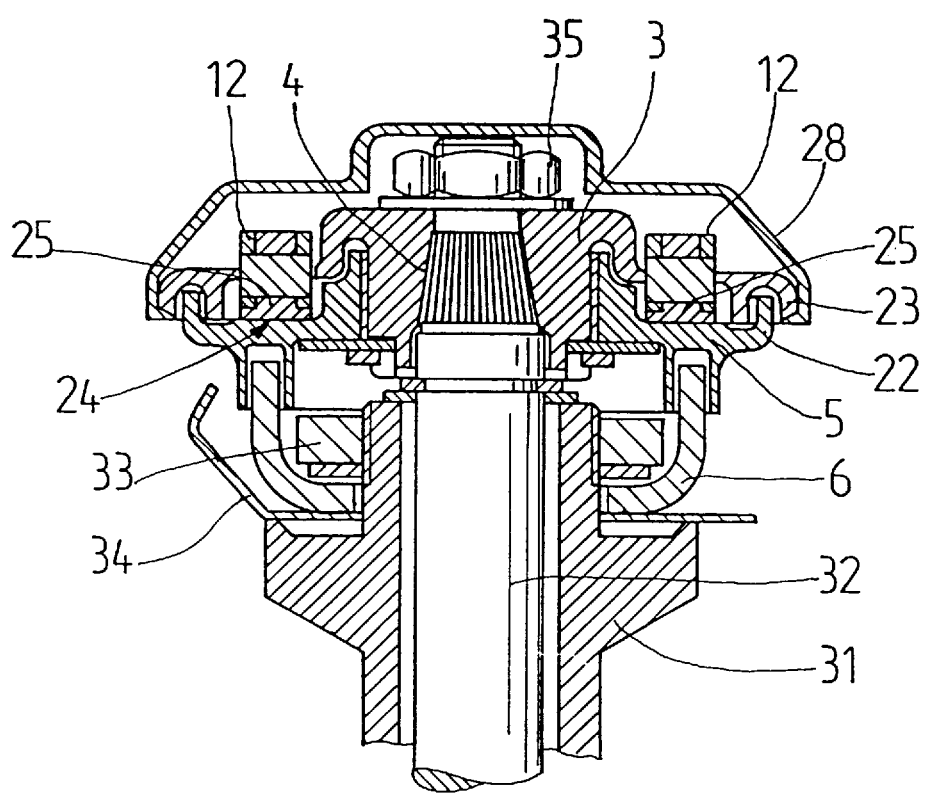

WINDSHIELD WIPER DEVICE WITH CONTACT PRESSURE ADJUSTMENT DEPENDENT ON THE WIPING ANGLE

BACKGROUND OF THE INVENTION

The invention pertains to a windshield wiper device, in particular for motor vehicles, with the properties of the main clause of claim 1, in which the force with which the wiper blade is pressed against the windshield to be cleaned is variable. This change in the contact force is completed in this case as a function of the position of the wiper blade within the wiper field to be wiped in an oscillating motion, i.e., as a function of the particular wiper angle. For good wiping quality, it is desirable that the wiper blade is pressed with a large force against the windshield to be cleaned, in the middle region of the wiper field which corresponds to the primary viewing direction of the driver. However, at the beginning and at the end of the wiper field, i.e., in the outer end position of the wiper arm, in which the direction of motion of the wiper blade is reversed, the contact force of the wiper blade will be small. Thus, the tipping of the wiper lip into the particular other position will be made easier, which contributes to a reduced loading of the wiper strip and to a reduction in the reversing noises.

From DE 4,028,494 A1 a windshield wiper device is already known with an adjusting device for a change in contact pressure dependent on the wiping angle. In this case, the adjusting device is comprised of a rocker arm attached in place to the bearing housing of the wiper shaft, and an adjusting lever which can pivot in the direction of the windshield to be cleaned and is seated at the attachment part of the windshield wiper. The rocker arm is equipped at its upper side, i.e., the side turned away from the windshield to be cleaned, with a cam which is moved down from the rocker-arm end of the adjusting lever during the pivoting motion of the wiper arm. At the opposing end, a contact spring designed as tension spring is provided, whose other end is articulated at the articulation part of the wiper rod of the wiper arm. When displaced by the cam, the adjusting lever is pivoted to a different position, so that the line of action of the contact spring is shifted. The shift causes the desired change in contact force.

A disadvantage of this windshield wiper device is that the end of the adjusting lever on the side near the rocker arm is pressed with relatively large force against the cam of the rocker arm. Due to this large surface pressure, the resistance to movement of the wiper arm is greatly increased, so that a larger drive force must be supplied to the wiper shaft. In addition, this surface pressure changes as a function of the structure of the cam, which disturbs the uniform sequence of the wiping motion.

Another disadvantage is that the rocker arm is used as a component of the wiper bearing and is attached with it to the vehicle chassis. With the attachment of the wiper arm to the knurled cone of the wiper shaft, due to different torques on the lock nut or due to dimensional tolerances of the receiving cone, the attachment part can be pressed axially with different amounts (of force). Thus, the base setting of the contact force can be very different, or a suitable adjustment must be made, which requires an additional expense. Finally, the rocker arm and/or its cam is not protected against environmental factors.

From EP 0,487,859 A1 is known a windshield wiper device whose adjusting device is similar in structure to that referenced in DE 4,028,494 A1. However, in this case, the rocker arm is not fixed, but can turn concentrically, by means of a separate drive unit, in a certain range about the geometric axis of the wiper shaft. Thus, the contact force of the wiper blade on the windshield to be cleaned can be changed as a function of the driving speed of the vehicle. In addition, the cam is provided at the underside of the rocker arm, so that the end of the adjusting lever facing the rocker arm rests from below on the cam. In addition, the disadvantages stated in DE 4,028,494 A1 likewise apply for this windshield wiper device.

The problem of the present invention is to improve the operating dependability of the windshield wiper device with contact force adjustment dependent on wiping angle and to increase the uniformity of the wiping motion of the wiping blade on the windshield being cleaned.

SUMMARY OF THE INVENTION

According to this invention, the problem is solved by using rocker arms having two cams running synchronous with each other and located axially to the rocker arm with respect to the wiper shaft. In addition, the section of the adjusting lever on the rocker arm side is of fork-like design so that this end of the adjusting lever is formed by two fork legs. Each fork leg cooperates with its assigned cam of the rocker arm. Due to the fork-like division of the end of the adjusting lever running down the cam, at each fork leg the surface pressure acting on the cam is reduced significantly, which leads to a reduction in the resistance to motion of the wiper arm. The fraction of the motive force of the wiper shaft which is consumed in overcoming the frictional resistance of the fork leg on the cams is very small. Thus, the influence of the adjusting device for the contact force on the uniformity of the wiping motion is negligible, and the operating dependability of the windshield wiper device is increased.

To ensure a permanent, satisfactory operation of the contact force adjustment dependent on wiping angle, the fork legs of the adjusting lever are permanently maintained in an operating connection with the cams of the rocker arms.

It has proven to be advantageous when the fork legs of the adjusting lever are equipped with guide shoes which rest upon the cams and slide along the cams during operation of the windshield wiper device. It is a particular advantage in achieving low frictional resistance and a small wear when the guide shoes are made of a plastic, in particular of a polyamide, and the rocker arms or the cams of the rocker arms are made of a different material, in particular of an acetal copolymerizate. The pairing of materials ensures an optimum wiping quality.

To achieve the smallest possible installation height while at the same time adapting the geometry of the windshield wiper device to the prevailing geometric conditions due to vehicle design, it is recommended to provide attachment part 3 with a crimped or stepped or bent configuration with a lead or opening receiving the adjusting lever as well as having two leads or openings receiving the legs of the adjusting lever.

If a somewhat greater distance between the fork legs and the cams of the rocker arms has to be accommodated in a windshield wiper device according to this invention, then the fork legs should have at their ends a region curved or angled in the direction of the cam. In this case, the guide shoes are attached on the front side to the curved or angled ends of the fork legs.

It is also proposed to design the attachment part and the wiper arm, together with the contact spring and the adjusting device for the contact pressure, as a preassembled installation unit. A preassembled installation unit of this kind is easy to handle during installation on the vehicle, greatly simplifying the assembly.

With the labyrinth seal between mounting part and rocker arm, interfering dirt is prevented from getting onto the slide surfaces of the cams and/or of the fork legs or the guide shoes attached to them.

BRIEF DESCRIPTION OF THE DRAWINGS

The invention will be described in greater detail below based on embodiment examples. The associated figures show in:

FIG. 1, an overall view of a windshield wiper device (shown in partial cross section), FIG. 2, a top view of the windshield wiper device from FIG. 1, FIG. 3, a section of the mounting part from FIG. 2 without adjusting lever FIG. 4, a top view of the adjusting lever of the adjusting device shown as a detail from FIG. 2, enlarged, FIG. 5, an enlarged section of the windshield wiper device shown in cross section, FIG. 6, a modification of the cams of the rocker arms, FIG. 7, another design of a windshield wiper device according to this invention, shown in cross section, and FIG. 8, the cross section VIII-VIII from FIG. 7, but with the windshield wiper device mounted to the vehicle.

DETAILED DESCRIPTION OF A PREFERRED EMBODIMENT

Figure 6:
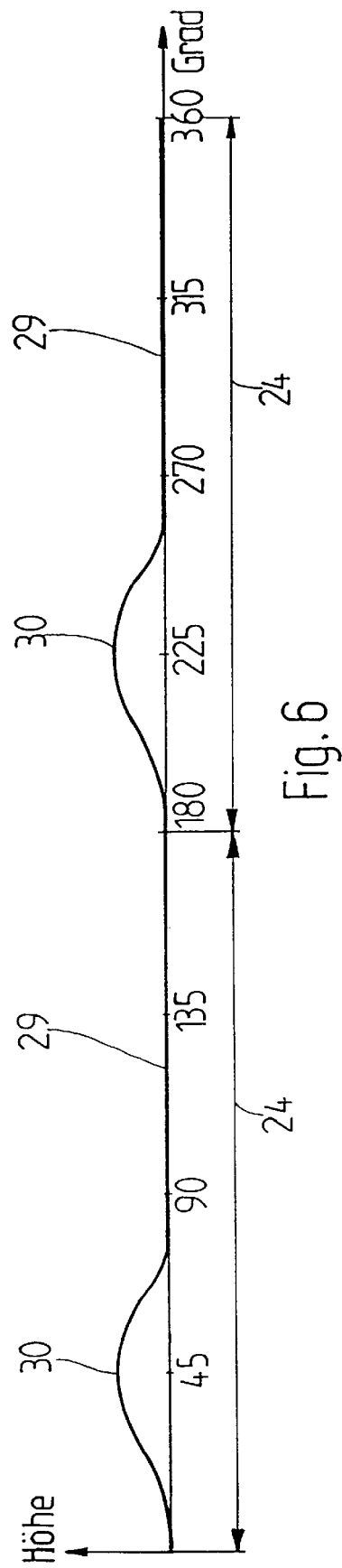

FIGS. 1 to 5 relate to the same embodiment of a windshield wiper device according to this invention, with FIGS. 1 and 2 presenting an overall view and FIGS. 3 to 5 showing details of the device.

The windshield wiper device presented in FIGS. 1 and 2 is not yet mounted to a vehicle. The wiper arm 1, which consists of an articulated part with a wiper rod attached to it, is articulated by means of a pivot axis 2 to the attachment part 3. The attachment part 3 is provided with an opening 4, which makes possible a torsion-resistant mounting of the attachment part 3, by means of an lock nut (not shown) to the end of a wiper shaft (not shown) which can be driven back and forth. The wiper arm 1 articulated to the attachment part 3 can pivot in the direction of the windshield (not shown) to be cleaned. The windshield wiper device is designed as a preassembled installation unit which includes the adjusting device for the adjustment of the contact pressure as a function of the wiper angle. This unit includes the wiper arm 1 with its attachment part 3, a rocker arm 5, and an adjusting lever 7 pivoted on the attachment part 3. A tension spring acting as contact spring 8 is articulated on one end to the wiper arm 1 and its other end is articulated by means of a bar 9 to the near end 10 of the adjusting lever 7. A retaining plate 6, used as a torsion lock on the rocker arm 5 on the wiper bearing, or to the vehicle chassis, can be part of the described structural unit and can be handled jointly with it. The retaining plate 6 can also be premounted separately to the wiper bearing or to the vehicle chassis, and the rocker arm 5 is engaged with the retaining plate 6 during attachment of the installation unit.

From FIG. 2 it is also evident that the adjusting lever 7 is of fork-like design in its section 11 on the side of the rocker arms (FIG. 1), so that the two fork legs 12 are formed. In the region 13 of the pivot bearing of the adjusting lever 7 with the attachment part 3, the attachment part 3 is crimped off or stepped, and has the hole 14 visible in FIG. 3, and the adjusting lever 7 passes through said hole. In addition, on the top side of the attachment part 3 there are the two openings 15 located on either side of the opening 4 diametrically opposite on an extended diameter of the opening 4. The downward curved ends of the fork leg 12 pass through these openings 15 and thus move into an operating connection with the rocker arm 5.

The structure of the adjusting lever 7, which is adapted to the structure of the attachment part 3, is quite visible from FIG. 4. On the end 10 which is opposite the section 11 on the rocker arm side with the two fork legs 12, there is a vertical slit 16 in the adjusting lever 7, open on the front side, which bridges a pin 17 located in a horizontal, aligned drill hole. Thus it is possible to hook the end of the contact spring 8 and/or the bar 9 to the end 10 of the adjusting lever 7.

From FIG. 5 we clearly see the design of the windshield wiper device premounted as an installation unit. The attachment part 3 has a downward protruding cylindrical lug 18 concentric to the opening 4 for attachment to a wiper shaft (not illustrated). On this cylindrical lug 18 there is a rocker arm 5 produced from an acetal copolymerizate (POM) which is provided with a corresponding central, cylindrical opening; this lug is attached from below and is held to it in an axial direction. The axial lock of the rocker arm 5 takes place in this case by means of a washer 19 attached in a torsion resistant manner on the cylindrical lug 18 of the attachment part 3, and held in an axial direction by means of a securing ring 20 located in a ring groove of the cylindrical lug 18. In order to ensure a slight, relative torsion of the rocker arm 5 with respect to the attachment part 3, a sliding sleeve 21 is located between the rocker arm 5 and the cylindrical lug 18. The edges 22 and 23 overlap each other in the manner of a labyrinth and thus form a labyrinth seal. This labyrinth seal prevents dirt from entering the space formed between the rocker arm 5 and the attachment part 3. The rocker arm 5 bears on its top side two cams 24 acting in an axial direction, whereby a cam 24 is allocated to a fork leg 12 of the adjusting lever 7. The two cams 24 form an annular path which runs concentrically to the opening 4, that is, concentrically to the geometric axis of the wiper shaft (not shown). In this case, the two cams 24 are located synchronously to each other. They are arranged central-symmetrically and in the present case are offset by 180. The precise path of the cams is indicated with the coil shown in FIG. 6.

Each fork leg 12 of the adjusting lever 7 has its essentially axially curved end passing through an opening 15 (FIG. 3) in the rear of the attachment part 3 and rests from above, with a guide shoe 25 of polyamide, on a cam 24 of the rocker arm 5. In order that the guide shoes 25 be held permanently in contact with the cams 24, the pivot bearing 26 of the adjusting lever 7 is located on the attachment part 3 at a distance, though a small distance, above the actuation line 27 of the contact spring 8.

To attach the preassembled installation unit, the attachment part 3 with the conical opening 4 is set on a corresponding, conical end of a wiper shaft, in a known manner, and is held in place, torsion locked to the wiper shaft by means of a lock nut. In this assembly, simultaneously the rocker arms 5 are made to engage in a positive and/or force-locked manner, to the two legs of the retaining plate 6 (by means of corresponding openings or pouches), which, as is evident from FIG. 8, is premounted to the housing 31 of the wiper bearing. This will ensure that the rocker arms 5 jointly attached to the attachment part 3 at the wiper shaft cannot be turned together with the attachment part 3 about the geometric axis of the wiper shaft. An additional adjustment of the rocker arm is thus not needed.

After attachment of the windshield wiper device on the wiper shaft, a covering flap 28 subsequently will snap into the attachment part 3, covering the section of the attachment part 3 located above the rocker arm 5. Thus, on one hand, a visually impressive view will be ensured and on the other hand, the section 11 of the adjusting lever 7 on the rocker-arm side, and also the openings 14 and 15, with the adjusting lever 7 passing through, are protected against the entrance of dirt.

Those technical features, which effect a torsion-lock of the retaining plate 6 and thus of the rocker arms 5 against the chassis, are configured so that they align the rocker arms 5 to the desired motion sequence. During operation of the windshield wiper, the wiper arm 1 pivots in a predetermined angular range about the wiper shaft, so that the wiper blade passes back and forth across the windshield being cleaned while covering the specified wiper field. The rocker arm 5 is adjusted in accordance with the desired profile of the contact force, so that the guide shoes 25 of the adjusting lever 7 pass through a wave trough 29 of the cam 24 when the wiper blade is located directly at or near the edge of the wiper field. Conversely, the guide shoes 25 of the adjusting lever 7 pass through a wave crest 30 of the cam 24 when the wiper blade is moving over the middle range of the wiper field.

FIG. 5 presents a position of the windshield wiper device in which the guide shoes 25 of the adjusting lever 7 are located in a wave trough 29 of the cam 24. When moving down the wave crest 30 of the cam 24, the adjusting lever 7 will pivot with its end 10 in the direction of the windshield being cleaned. Thus, the operating line 27 of the contact spring 8 is shifted in the direction of the windshield to be cleaned. Due to the changed division of force components of the contact spring 8, the contact force of the wiper blade against the windshield being cleaned will be increased.

In the two cams 24 illustrated in the diagram in FIG. 6, the degrees of angle are plotted on the abscissa and the height of the cam 24 is plotted on the ordinate axis. From the profile of the wave crests 30 and of the wave troughs 29 it is evident that the two cams 24 are arranged synchronous and centrally symmetrical to each other with an offset of 180°. The profile of the cams 24, moreover, provides an indication of how the contact force of the wiper blade on the windshield to be cleaned changes when passing over the wiper field.

Figure 7:
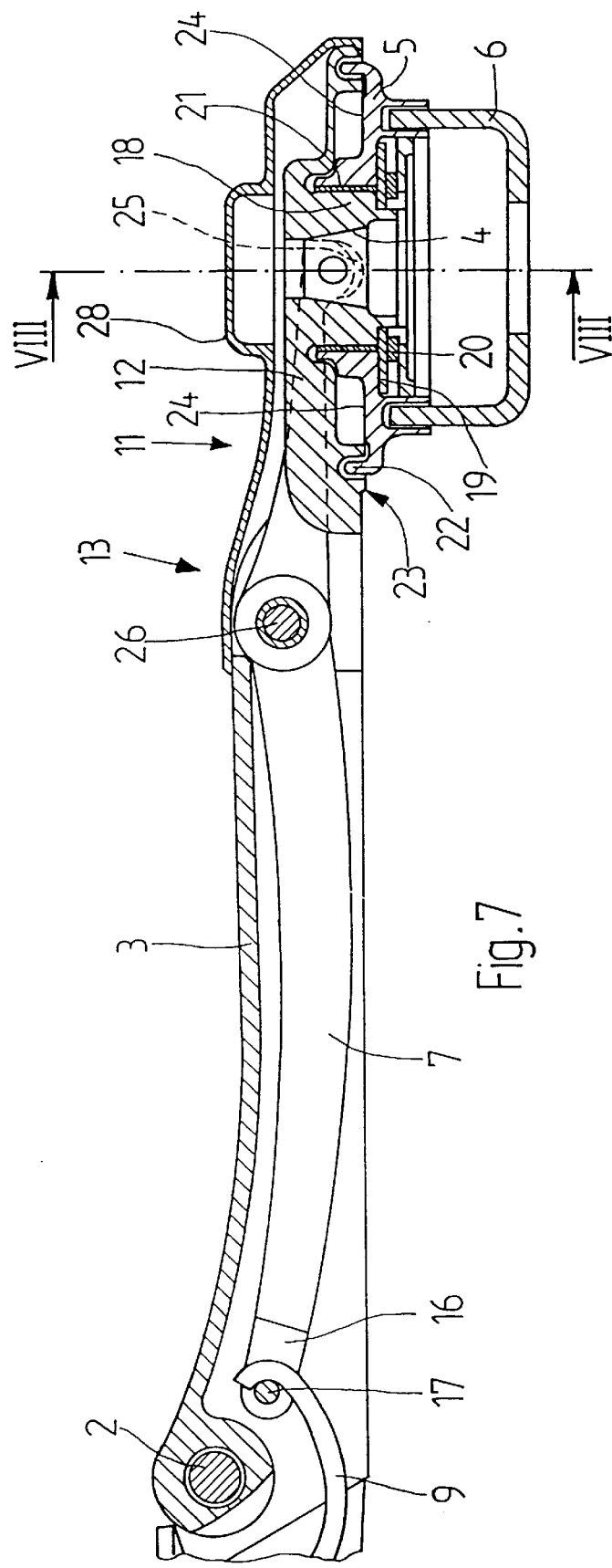

The other embodiments of a windshield wiper device according to this invention shown in FIGS. 7 and 8 are quite similar to the embodiment described on the basis of FIGS. 1 to 6. Therefore, the previous description applies essentially also to the embodiment of FIGS. 7 and 8. Differences between the two embodiments will occur in that the attachment part 3 in FIGS. 7 and 8 is kept very flat, so that an exceptionally low installation height of this attachment part 3 is obtained. The crimping or stepping of the attachment part 3 in the region 13 turns out to be relatively slight. Likewise, the cylindrical lug 18 is kept much flatter. Consequently, the ends of the fork leg 12 of the adjusting lever 7 are not curved off or angled axially, rather they are merely thickened somewhat, in order to enable a sensible attachment of the guide shoes 25 to the fork legs 12. It is also evident (in particular from FIG. 8), that the top side of the attachment part 3 in the rocker arm-side section 11 of the adjusting lever 7 has been profiled and shaped so that prominent parts of the top side of the attachment part 3 extend between the two fork legs 12 of the adjusting lever 7.

From FIG. 8 it is also evident that the housing 31 of a wiper bearing, in which a wiper shaft 32 is pivoted, is attached by means of a lock nut 33 to a part 34 of the vehicle chassis. The retaining plate 6 which makes a positive lock with the rocker arms 5, is likewise locked to the chassis by means of the lock nut 33. In this case, the retaining plate 6 is aligned so that it simultaneously adjusts the cams 24 of the rocker arms 5, as in the previous embodiment. The windshield wiper device according to this invention is attached to the wiper shaft 32 which is driven back and forth such that the attachment part 3 with the conical opening 4 is set onto the end of the wiper shaft 32 and is locked, twisted tight to the wiper shaft 32 by means of the lock nut 35. To increase the rotation lock, the end of the wiper shaft 32 features, in a known manner, a section designed as knurled cone.

The function of this embodiment is identical to that of the preceding embodiment and therefore need not be described again.

We claim:

1. A windshield wiper device for motor vehicles with contact pressure adjustment dependent on a wiping angle, the windshield wiper device comprising:

an attachment piece configured to be rotatably fixed to a wiper shaft for reciprocating movement therewith about a first axis;

a wiper arm pivotably attached to the attachment piece to pivot in a direction of a windshield;

a wiper blade attached to the wiper arm;

a contact spring operably pressing the wiper blade onto the windshield and having a first end attached to the wiper arm and defining a line of action between the first end of the spring and a second end of the spring; and an adjusting device to which the second end of the contact spring is attached with the adjusting device configured to vary a force of the wiper blade against the windshield as a function of a wiping angle of the blade and the adjusting device including:

a rocker arm mounted in a fixed position having an annular cam centered on the first axis, and an adjusting lever pivotably mounted to the attachment piece at a pivot axis for pivoting in the direction of the windshield and the lever having a first end in engagement with the annular cam and the lever having a second end to which a second end of the contact spring is connected, wherein relative rotation between the attachment piece and the rocker arm displaces the first end of the adjusting lever and resultantly varying the force of the wiper blade toward the windshield wherein the annular cam of the rocker arm includes two mutually synchronous cams and the first end of the adjusting lever includes a forked portion having two fork legs simultaneously displaced by the cams of the rocker arm.

2. A windshield wiper device according to claim 1, wherein the pivot axis of the adjusting lever is located to provide a spacing between the pivot axis and the actuation line of the contact spring for every possible wiper angle and the spacing insuring that the first end of the adjusting lever is pressed continuously against the cam of the rocker arm.

3. A windshield wiper device according to claim 1, wherein slide shoes are located at the two fork legs of the adjusting lever with the slide shoes resting on the cams of the rocker arm.

4. A windshield wiper device according to claim 3, wherein the slide shoes are made of a polyamide plastic and the cams are formed of acetal copolymerizate.

5. A windshield wiper device according to claim 1, wherein a portion of the attachment part is bent and has an opening near the bent portion and the adjusting lever passes through the opening with the fork-like section of the adjusting lever being disposed on the upper side of the attachment part proximate to the cams of the rocker arm and the attachment part having two additional openings with the openings receiving the fork legs of the adjusting lever.

6. A windshield wiper device according to claim 1, wherein the fork legs of the adjusting lever run essentially parallel to the upper side of the attachment piece and are angled at the end of the lever in the direction of the axially extending cams of the rocker arms with the slide shoes attached to the angled front side of the fork legs.

7. A windshield wiper device according to claim 1, wherein the attachment part and the wiper arm, together with a contact spring and the adjusting device for the contact pressure, all form a premounted assembly.

8. A windshield wiper device according to claim 7, wherein the attachment part has a cylindrical lug located concentric to an aperture adapted to receive the wiper shaft, the lug configured for attachment to the wiper shaft and the rocker arm has a passage receiving the lug of the attachment part and the rocker arm is secured relative to the attachment part in the axial direction by a washer engaging the attachment part.

9. A windshield wiper device according to claim 1, wherein the cams of the rocker arm run concentrically to a geometric axis of the opening for attachment to the wiper shaft and the cams are arranged centrally symmetrical to each other with an offset of 180° C., and the fork legs of the adjusting lever rest on the cams diametrically opposite each other with respect to the opening, thereby rendering the windshield wiper device relatively insensitive to small deviations in the location of the rocker arm.

10. A windshield wiper device according to claim 1, wherein the rocker arm cooperates with the attachment part to define a labyrinth seal protecting the cams from dirt.

* * * * *

UNITED STATES PATENT AND TRADEMARK OFFICE
CERTIFICATE OF CORRECTION

PATENT NO. : 5,771,527
DATED      : Jun. 30, 1998
INVENTOR(S): Thomas Blachetta; Bruno Egner-Walter; Harro Buhl It is certified that error appears in the above-identified patent and that said Letters Patent is hereby corrected as shown below:

Col. 8, line 11, in Claim 9, please delete "C." after --180°-- therefor.

Signed and Sealed this

Fifth Day of January, 1999

Attest:

Attesting Officer

Acting Commissioner of Patents and Trademarks